(12) United States Patent
Hudis et al.

(10) Patent No.: US 11,533,240 B2
(45) Date of Patent: Dec. 20, 2022

(54) AUTOMATIC RECOMMENDATIONS FOR DEPLOYMENTS IN A DATA CENTER

(71) Applicant: Microsoft Technology Licensing, LLC, Redmond, WA (US)

(72) Inventors: Efim Hudis, Bellevue, WA (US); Hani-Hana Neuvirth, Tel Aviv (IL); Daniel Alon, Tel Mond (IL); Royi Ronen, Tel Aviv (IL); Yair Tor, Sammamish, WA (US); Gilad Michael Elyashar, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 15/156,182

(22) Filed: May 16, 2016

(65) Prior Publication Data
US 2017/0207980 A1    Jul. 20, 2017

Related U.S. Application Data

(60) Provisional application No. 62/279,435, filed on Jan. 15, 2016.

(51) Int. Cl.
*H04L 41/14* (2022.01)
*G06Q 30/06* (2012.01)
(Continued)

(52) U.S. Cl.
CPC .......... *H04L 41/145* (2013.01); *G06F 8/60* (2013.01); *G06Q 30/0631* (2013.01); *H04L 41/0803* (2013.01); *H04L 67/34* (2013.01)

(58) Field of Classification Search
None
See application file for complete search history.

(56) References Cited

U.S. PATENT DOCUMENTS 7,644,051 B1 * 1/2010 Moore ............... G05B 13/027
                                                  706/16
8,255,529 B2   8/2012 Ferris et al.
(Continued)

FOREIGN PATENT DOCUMENTS

CN    102067632 A    5/2011
CN    104765793 A    7/2015
(Continued)

OTHER PUBLICATIONS

John C. Platt, Sequential Minimal Optimization, Apr. 21, 1998, Microsoft Research Team (pp. 2-9) (Year: 1998).*
(Continued)

*Primary Examiner* — Oleg Survillo
*Assistant Examiner* — Christopher P Cadorna
(74) *Attorney, Agent, or Firm* — Wade IP Law PLLC

(57) ABSTRACT

A recommendation system for recommending a target feature value for a target feature for a target deployment is provided. The recommendation system, for each of a plurality of deployments, collects feature values for the features of that deployment. The recommendation system then generates a model for recommending a target feature value for the target feature based on the collected feature values of the features for the deployments. The recommendation system applies the model to the features of the target deployment to identify a target feature value for the target feature. The recommendation system then provides the identified target feature value as a recommendation for the target feature for the target deployment.

20 Claims, 10 Drawing Sheets

(51) Int. Cl.
  *G06F 8/60* (2018.01)
  *H04L 41/0803* (2022.01)
  *H04L 67/00* (2022.01)

(56) References Cited

U.S. PATENT DOCUMENTS

| | | | |
|---|---|---|---|
| 8,504,504 B2 | 8/2013 | Liu | |
| 8,606,924 B2 | 12/2013 | Gujral et al. | |
| 8,918,439 B2 | 12/2014 | Alatorre et al. | |
| 8,949,162 B1 | 2/2015 | Pillay | |
| 2008/0040455 A1* | 2/2008 | MacLeod | G06F 8/61 709/220 |
| 2014/0047545 A1 | 2/2014 | Sidagni | |
| 2014/0068053 A1 | 3/2014 | Ravi et al. | |
| 2014/0136360 A1 | 5/2014 | Schaad | |
| 2014/0196105 A1 | 7/2014 | Hung et al. | |
| 2014/0201836 A1 | 7/2014 | Amsler | |
| 2014/0279641 A1 | 9/2014 | Singh et al. | |
| 2014/0281741 A1 | 9/2014 | Bohacek | |
| 2015/0019204 A1* | 1/2015 | Simard | G06F 17/2785 704/9 |
| 2015/0020061 A1 | 1/2015 | Ravi | |
| 2015/0066599 A1 | 3/2015 | Naseh et al. | |
| 2015/0172321 A1 | 6/2015 | Kirti et al. | |
| 2015/0288569 A1 | 10/2015 | Agarwal et al. | |

FOREIGN PATENT DOCUMENTS

| | | |
|---|---|---|
| CN | 105119956 A | 12/2015 |
| WO | 2013062462 A1 | 5/2013 |

OTHER PUBLICATIONS

Chih-Wei Hsu, et al. A Practical Guide to Support Vector Classification, Apr. 15, 2010, National Taiwan University (p. 2) (Year: 2010).*
Shih-wei Liao, Machine Learning-Based Prefetch Optimization for Data Center Applications, 2009, ACM (2.1, 3.4, 4.1) (Year: 2009).*
"Office Action Issued in European Patent Application No. 17701410. 7", dated Nov. 5, 2019, 12 Pages.
"VMware NSX DFW Policy Rules Configuration Technical White Paper", Retrieved from: https://www.vmware.com/content/dam/digitalmarketing/vmware/en/pdf/whitepaper/nsx/whitepaper-dfw-policy-rules-configuration-guide.pdf, Sep. 23, 2014, 22 Pages.
"Summons to Attend Oral Proceedings Issued in European Patent Application No. 17701410.7", Mailed Date: Apr. 30, 2020, 18 Pages.
"Second Office Action Issued in Chinese Patent Application No. 201780004250 4", dated Dec. 1, 2021, 10 Pages.
"Office Action and Search Report Issued in Chinese Patent Application No. 201780004250.4", dated Jul. 23, 2021, 12 Pages.
"Office Action Issued in Chinese Patent Application No. 201780004250. 4", dated Jul. 4, 2022, 13 Pages.
"Third Office Action Issued in Chinese Patent Application No. 201780004250.4", dated Mar. 18, 2022, 8 Pages.
"Second Written Opinion Issued in PCT Application No. PCT/US2017/013082", dated Jul. 26, 2017, 10 Pages.
"International Preliminary Report on Patentability Issued in PCT Application No. PCT/US2017/013082", dated Dec. 22, 2017, 11 Pages.
Al-Shaer, Ehab, "Automated Firewall Analytics: Design, Configuration and Optimization", In Publication of Springer, Sep. 23, 2014, 10 Pages.
Krishnan, et al., "Building Your Next Big Thing with Google Cloud Platform: A Guide for Developers and Enterprise Architects", In Publication of Apress, May 24, 2015, 102 Pages.
Ardagna et al., "From Security to Assurance in the Cloud: A Survey," In Journal of ACM Computing Surveys, vol. 48 Issue 1, Jul. 2015, 50 pages.
Ricci, F. et al., "Reconmender Systems Handbook", In Springer Publication, Oct. 28, 2010, 278 Pages.
Tulloch, Mitch, "Microsoft System Center—Deploying Hyper-V with Software-Defined Storage & Networking," In Microsoft Press, Mar. 16, 2015, 239 Pages.
DaFonseca, N.L.S. and R. Boutaba, "Cloud Services, Networking, and Management," In IEEE Press Series on Networks and Services Management, Apr. 20, 2015, 50 Pages.
Cain, et al., "Microsoft System Center—Building a Virtualized Network Solution," In Microsoft Press, Jul. 28, 2015, 206 Pages.
"Sequential Minimal Optimization", Retrieved from<<https://en.wikipedia.org/w/index.php?title=Sequential minimal optimization &oldid= 688732632>>, Nov. 2, 2015, 3 Pages.
"Event-Driven Architecture", Retrieved from<<https://en.wikipedia.org/w/index.php?title=Event-drivenarchitecture&oldid= 696694134>>, Dec. 25, 2015, 6 Pages.
"International Search Report and Written Opinion Issued in PCT Application No. PCT/US2017/013082", dated Mar. 21, 2017, 11 Pages.

* cited by examiner

Restrict Data Collection

Categories

- [ ] resources
- [ ] configuration of resources
- [ ] usage patterns
- [ ] network data
- [ ] appliances
- [ ] logs
- [ ] IoCs Next

*FIG. 3*

Restrict Data Collection

Configuration of Resources

- [ ] VMS
- [ ] Storage
- [ ] PaaS products
- [ ] Subscription 1
  - [ ] group a
  - [ ] group b
  - ...

Back  Next

Recommendation Policy

- ☐ resources
- ☐ appliances
- ☐ security package
- ☐

Recommendation Policy
(appliances)

Allow

- ☐ Company A
  - ☐ appliance $A_1$
  - ☐ appliance $A_2$
- ☐ Company B
  - ☐ appliance $B_1$
  - ☐ appliance $B_2$

AUTOMATIC RECOMMENDATIONS FOR DEPLOYMENTS IN A DATA CENTER

CROSS-REFERENCE TO RELATED APPLICATION

This application claims the benefit of U.S. Provisional Application No. 62/279,435, filed on Jan. 15, 2016, which is hereby incorporated by reference in its entirety. In cases in which a document incorporated by reference herein is inconsistent with contents of this application, the contents of this application control.

BACKGROUND

When software is to be deployed in a data center, the configuration of the deployment needs to be established. The configuration of the deployment includes the identification of the various deployed systems of the deployment such as the servers, the operating systems and other system software, the applications (e.g., appliances), the security systems, the storage systems, the networking systems, and so on. An operating system, for example, may be identified by name of the operating system, version number, patch level, and so on. Each of the deployed systems may have various sub-systems. For example, a security system may have a firewall appliance, an anti-virus appliance, an encryption appliance, and so on. The configuration of the deployment includes the identifications of such sub-subsystems, any sub-sub-systems, and so on. Each of these deployed systems and sub-systems may have various parameters or configuration settings which are also part of the configuration of the deployment. For example, an anti-virus appliance may have parameters that indicate which types of documents to scan and when to scan those types of documents. The types of documents may include emails, email attachments, web pages, newly created documents, and so on. The configuration settings may indicate to scan email attachments when they are received or when they are to be opened. The identifications of the systems of a deployment, the parameters of the systems and sub-systems, and other settings describing a current configuration of a system or sub-system are referred to as features of the deployment.

A large deployment can have hundreds and even thousands of features. When establishing the feature values for the features, it is important that they be established at optimal values to satisfy objectives for the deployment such a minimum response time, highly secure, and so on. The establishing of the feature values, however, can be a very complex and time-consuming process. For example, a certain firewall appliance may not work well with a certain patch level of a certain version of an operating system. So, an administrator of a deployment would want to ensure that the certain firewall appliance and the certain patch level are not part of the deployment either during initial configuration of the deployment or as part of an upgrade to the deployment. It can require a very high-level of skill to establish the optimal feature values for a deployment and to re-establish feature values when problems arise such as a system failure, software is infected with a virus, an intrusion is detected, and so on. Even when an administrator has such a high-level of skill, the administrator may not have all the information available to establish the optimal values. For example, the administrator may be unaware of a recent intrusion of a deployment of another organization. Even if the administrator did have all the information, the number of different combinations of feature values for the features can be astronomically high making the understanding the effects, which can be subtle, of each combination very difficult.

SUMMARY

A method and system for recommending a target feature value for a target feature for a target deployment is provided. In some embodiments, a recommendation system, for each of a plurality of deployments, collects feature values for the features (including the target feature) of that deployment. The recommendation system then generates a model for recommending a target feature value for the target feature based on the collected feature values of the features for the deployments. The recommendation system applies the model to the features of the target deployment to identify a target feature value for the target feature. The recommendation system then provides the identified target feature value as a recommendation for the target feature for the target deployment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 3 illustrates a display page for an administrator of a deployment to restrict the type of data that is collected by the recommendation system.

FIG. 4 illustrates a display page for an administrator to select the resources whose configuration information is not to be collected.

FIG. 5 illustrates a display page for an administrator to set constraints on or policies for recommendations.

FIG. 6 illustrates a display page for an administrator to set constraints for appliances of various companies.

DETAILED DESCRIPTION

Figure 1:
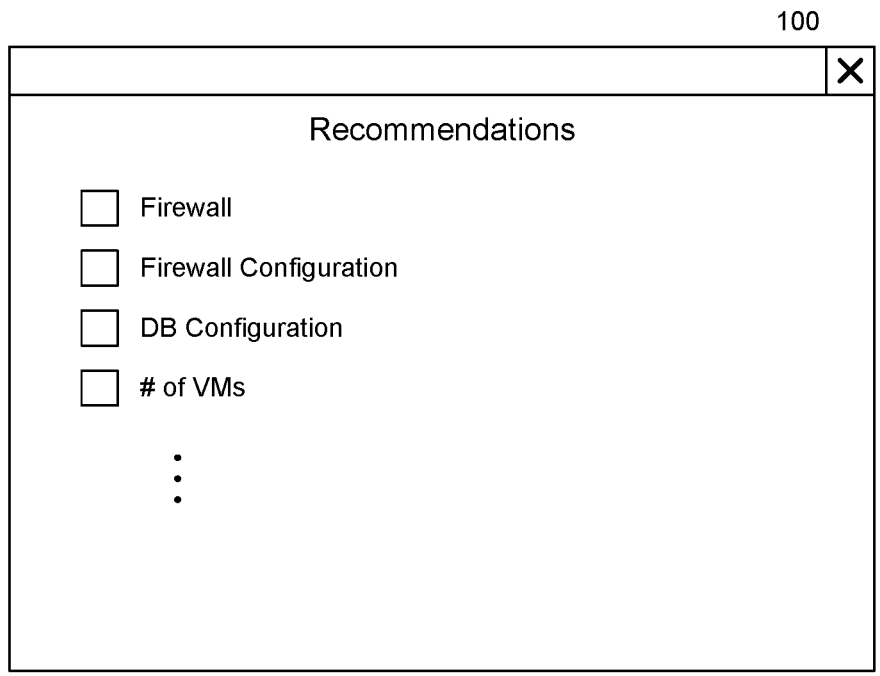
FIG. 1 illustrates a display page that allows a user to select target features to be recommended.

A recommendation system for recommending a feature value for a target feature for a target deployment within a data center is provided. In some embodiments, the recommendation system recommends a feature value for the target feature based on similarity between the features of the target deployment and the features of other deployments in the data center. For example, if all the deployments with similar features use a certain firewall, the recommendation system may recommend that certain firewall for the target deployment. To support making recommendations, the recommendation system collects feature values for features, including the target feature, of deployments within the data center. (A data center may provide computer resources at a single geographic location or at multiple geographic locations.) The features may relate to data center resources (e.g., virtual machines and storage), appliances (e.g., firewalls and packet filters), configuration information and log files of the data center resources and appliances, and so on.

After collecting the feature values, the recommendation system generates a model for recommending a feature value for the target feature based on the collected feature values of the features for the deployments with the feature value of the target feature being a label for each deployment. For example, if the target feature is a firewall, then then the feature value may be the name of a firewall. The recommendation system may generate a feature vector for each deployment and label each feature vector with the name of the firewall used by the deployment. The model may be generated using one or more machine learning techniques. After generating the model, the recommendation system applies the model to the features of the target deployment to identify a feature value for the target feature and provides the identified feature value as a recommendation for the target feature for the target deployment. For example, if the features of the target deployment are most similar to features of deployments that use a firewall with a certain name, then the recommendation system recommends that the target deployment use the firewall with that certain name. The recommendation system thus performs collaborative filtering to base recommendations on deployments with similar features.

In some embodiments, the recommendation system may generate a model for each possible target feature using the features of all the deployments as training data for the model. For example, the recommendation system first collects the feature values of the features of all deployments. For each possible target feature, the recommendation system generates a feature vector for each deployment, labels each feature vector with the feature value of the possible target feature for that deployment, and trains a model using feature vectors and labels as training data. To make a recommendation for a target feature for a target deployment, the recommendation system generates a feature vector for the target deployment and applies the model for that target feature to the feature vector to determine the feature value for the target feature to recommend.

Alternatively, rather than having only one model for each target feature, the recommendation system may generate separate models for clusters of similar deployments. The recommendation system first clusters the deployments based on similarity between features of the deployments. For example, the recommendation system may use a k-means clustering algorithm or a k-nearest neighbor clustering algorithm. The recommendation system may select a subset of the features for generating the clusters. The recommendation system may then generate a model for each cluster using training data that includes for each deployment, a feature vector of feature values of features of that deployment that is labeled with the feature value of the target feature (i.e., target feature value) of that deployment. For example, if 10 clusters are generated, the recommendation system generates 10 models (e.g., classifiers) for the target feature. The recommendation system may use different sets of features when generating the clusters and the models. Indeed, the recommendation system may even use different sets of features to generate the models for the different clusters. For example, it may be that all the deployments in a certain cluster have the same feature value for a certain feature. In such a case, that certain feature is not informative to distinguish feature values for the target feature. Another cluster, however, may have different feature values for that certain feature and thus may be informative to distinguish feature values for the target feature. The recommendation model may generate a model for each cluster for each possible target feature. For example, if there are five target features and 10 clusters, the recommendation system generates 50 models. The recommendation system may even generate different clusterings of deployments for different target features. For example, the recommendation system may use one set of features to generate six clusters for one target feature and use another set of features to generate 11 clusters for another target feature.

In some embodiments, when a model is generated for each cluster, the recommendation system generates a recommendation by first identifying the cluster of deployments to which the target deployment is most similar. For example, the recommendation system may generate a representative feature vector for each cluster. If the feature value of a feature is numeric (e.g., number of virtual machines), then the representative feature value for that feature may be an average, mean, or median of the feature values within the cluster. If the feature value is non-numeric (e.g., name of a firewall), then the representative feature value may indicate the percentage of deployments in the cluster that have each non-numeric value. The recommendation system may identify the most similar cluster based on cosine similarity between the representative feature vector for a cluster and the feature vector for the target deployment. After identifying the most similar cluster, the recommendation system applies the model for that cluster to the feature vector of the target deployment to generate the recommendation for the target feature.

In some embodiments, the recommendation system may monitor the features of the deployments in real time and provide recommendations based on changes in the features of the deployments. For example, if several deployments are the subject of a certain type of attack, some administrators of deployments may quickly change the configuration of their firewalls in an attempt to thwart the attack. The recommendation system may use such changes in the configurations as a trigger to launch the generating of recommendations for changing the configurations of firewalls of other deployments. The trigger may be based on a recommendation criterion such as a percentage of deployments that change their configuration in a certain time period, the sophistication of the deployments, the reputation of administrators of the deployments, and so on. The recommendation system generates a recommendation relating to the configuration of the firewall for other deployments and provides the recommendation for each deployment. In some embodiments, a deployment may authorize the automatic implementing of recommendations. In such a case, the recommendation system may direct a configuration manager of the deployment to change the configuration to automatically implement the recommended configuration without the explicit approval of an administrator of the deployment. The recommendation system may also regenerate models because of changes in the features of the deployments. As the features of the deployments change, the current models may not be as effective in making appropriate recommendations. The recommendation system may regenerate models, for example, based on when a certain time period has elapsed, the percentage of deployments that change a feature used in clustering or generating a model, and other factors such as those used to trigger the generation of recommendations.

The recommendation system provides a solution to various technical problems encountered when configuring a deployment. For example, a target deployment may use a default configuration for a firewall that is not effective at thwarting certain types of attacks. As other deployments within the data center change their configurations to thwart an attack, the recommendation system may direct the target deployment to change its configuration accordingly. As another example, the response time for users of a target deployment may become unacceptably long. Because of the complexities of the target deployment, it can be difficult to identify a solution that would improve response time. In such a case, an administrator of the target deployment may request recommendations for various target features. Since the features of a deployment may include usage patterns of users, the recommendation system may recommend, for example, increasing the number of virtual machines or the amount of storage based on deployments with similar usage patterns.

FIGS. 1-6 illustrate aspects of the user experience of the recommendation system in some embodiments. FIG. 1 illustrates a display page that allows a user to select target features to be recommended. A display page 100 lists various target features (or categories of target features), such as firewall, firewall configuration, database configuration, number of virtual machines, and so on. A user may select one or more of the target features for which the user wants a recommendation for their deployment.

Figure 2:
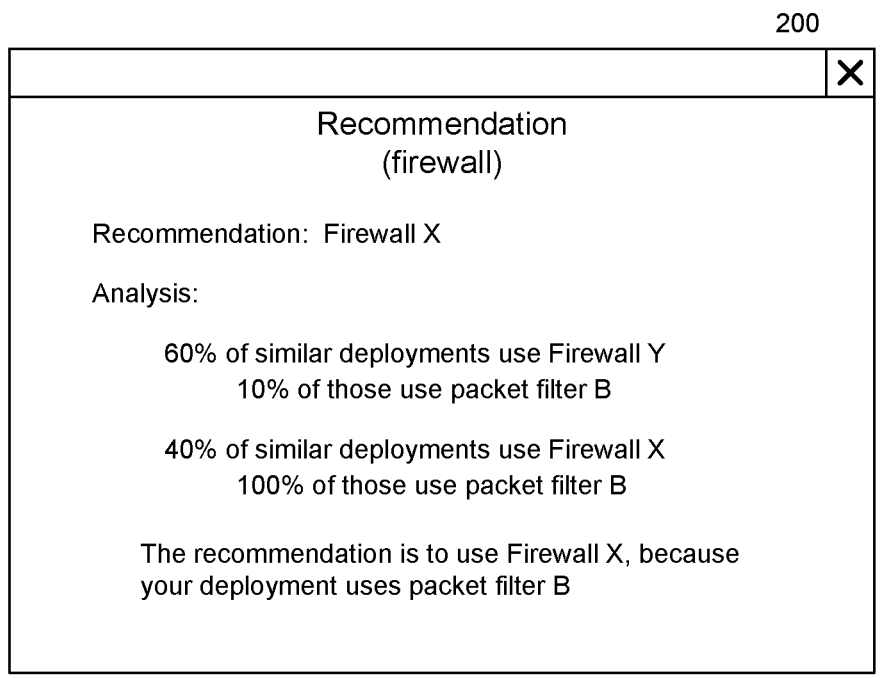
FIG. 2 illustrates a display page that provides a recommendation for a target feature.

FIG. 2 illustrates a display page that provides a recommendation for a target feature. A display page 200 provides a recommendation for a target feature that is a firewall. In this example, the recommendation system recommended that the deployment use firewall X. The recommendation system may also generate and provide an analysis of why firewall X was recommended. In this example, the analysis indicates that 60% of similar deployments use firewall Y and 40% use firewall X. The recommendation system recommended firewall X, however, because the target deployment uses packet filter B, and 100% of the deployments that use firewall X also use packet filter B while only 10% of the deployments that use firewall Y also use packet filter B.

FIG. 3 illustrates a display page for an administrator of a deployment to restrict the type of data that is collected by the recommendation system. Although a data center may request that deployments make certain types of data available for collection by the recommendation system in exchange for using the recommendation system, some deployments may not want to make all the requested data available. For example, certain governments may require that permission be requested and granted before certain types of data can be collected. As another example, a deployment may consider usage patterns of its users to be confidential and may not want the usage patterns to be collected even though they are used anonymously. A display page 300 lists categories of data. To restrict the collection of data, the administrator selects the category to view the types of data whose collection may be restricted.

FIG. 4 illustrates a display page for an administrator to select the resources whose configuration information is not to be collected. A display page 400 lists various resources such as virtual machines, storage, platform as a service ("PaaS") products, subscriptions (e.g., collections of resources), groups (e.g., group of resources in a collection), and so on. In this example, an administrator may want to restrict the collection of configuration information for group b of subscription 1 because it represents a group of resources that processes highly confidential information.

FIG. 5 illustrates a display page for an administrator to set constraints on or policies for recommendations. For example, an administrator may want a deployment to use firewalls only from certain companies. A display page 500 lists categories of target features whose recommendations can be constrained. The target features that may be constrained may include features relating to resources, appliances, security packages, and so on.

FIG. 6 illustrates a display page for an administrator to set constraints for appliances of various companies. A display page 600 lists companies and their appliances. The recommendation system may input a list of companies and their appliances or may generate the list from analysis of the collected deployment data. An administrator can select to allow recommendations on a company-by-company basis or on an appliance-by-appliance basis.

Figure 7:
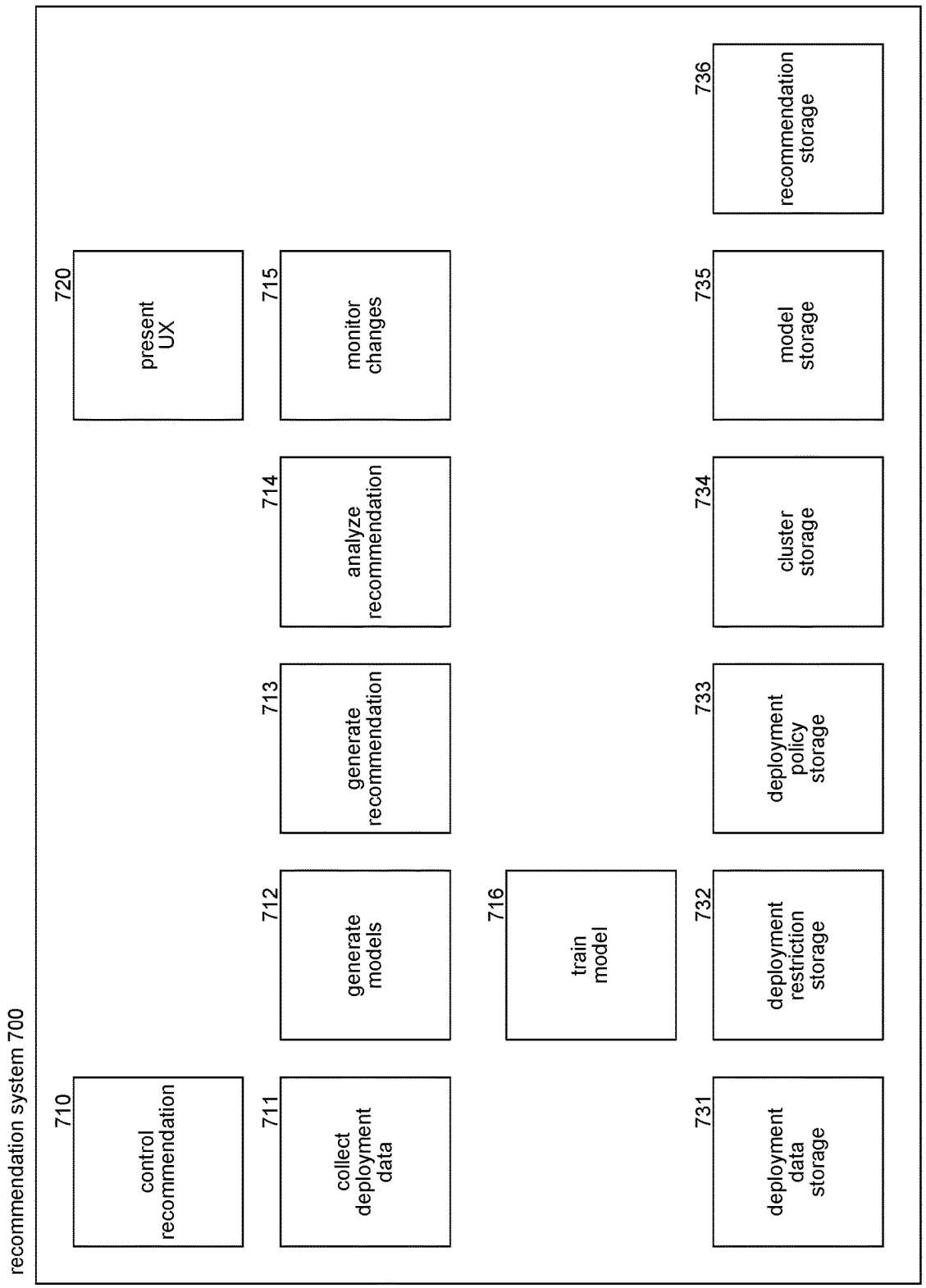
FIG. 7 is a block diagram illustrating components of a recommendation system in some embodiments.

FIG. 7 is a block diagram illustrating components of a recommendation system in some embodiments. The recommendation system 700 may include various modules or components 710-720 that implement the recommendation system and various data storages 731-736 to store data relating to the recommendations. A control recommendation component 710 controls the overall process of collecting data, generating models, and providing recommendations. The control recommendation component may invoke a collect deployment data component 711, a generate models component 712, a generate recommendation component 713, an analyze recommendation component 714, and a monitor changes component 715. The collect deployment data component collects data from the various deployments of a data center. The generate models component generates models for target features and invokes a train model component 716 to train each model. The generate recommendation component generates a recommendation for a target feature of a target deployment using a generated model. The analyze recommendation component generates analysis of why a certain target feature value was recommended. The monitor changes component monitors the changes in feature values of the deployments in a data center and triggers the making of recommendations when the changes satisfy a recommendation criterion. A present user experience component 720 coordinates the presenting of the user interface to an administrator of a deployment. The data storages include a deployment data storage 731, a deployment restriction storage 732, a deployment policy storage 733, a cluster storage 734, a model storage 735, and a recommendation storage 736. The deployment data storage stores the deployment data that is collected by the recommendation system. The deployment restriction storage stores any restrictions placed on the collection of data by deployments. The deployment policy storage stores the policies or constraints on recommendations specified by each deployment. The cluster storage stores the information describing each cluster, such as the deployments within each cluster and a representative feature vector of each cluster. The recommendation system may also have multiple clusterings of the deployments for use in recommending different sets of target features. For example, the deployments may be clustered using one set of feature vectors and clustered again using a second set of feature vectors. The model storage stores the information describing each model. The information may include weights for the various features used by the model. The recommendation storage stores the recommendations that have been provided to various deployments.

The computing systems on which the recommendation system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the recommendation system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The recommendation system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the recommendation system may be implemented in hardware using, for example, an application-specific integrated circuit (ASIC).

In some embodiments, the recommendation system may use various machine learning techniques, such as a support vector machine, a Bayesian network, learning regression, and a neural network, when generating models. For example, after clustering deployments, the recommendation system may employ a support vector machine to train classifiers for each cluster that implement the model. To train a classifier for a certain target feature value (e.g., certain firewall), the recommendation system may use the feature vectors of the deployments that have that target feature value as positive examples of training data and the feature vectors of the deployments that do not have that target feature value as negative examples of training data.

A support vector machine operates by finding a hypersurface in the space of possible inputs. The hypersurface attempts to split the positive examples (e.g., filter of company X) from the negative examples (e.g., filter of company Y) by maximizing the distance between the nearest of the positive and negative examples and the hypersurface. A support vector machine simultaneously minimizes an empirical classification error and maximizes a geometric margin. This allows for correct classification of data that is similar to but not identical to the training data. Various techniques can be used to train a support vector machine.

One technique uses a sequential minimal optimization algorithm that breaks the large quadratic programming problem down into a series of small quadratic programming problems that can be solved analytically. (See Platt, J., "Sequential Minimal Optimization," 1998 http://research.microsoft.com/pubs/69644/tr-98-14.pdf.)

A support vector machine is provided training data represented by $(x_1, y_1)$ where $x_i$ represents a feature vector and $y_i$ represents a label for page i. A support vector machine may be used to optimize the following:

$$\min_{w,b,t} \frac{1}{2} w^T w + C \sum_{i=1}^{l} \xi_i$$

such that $y_i(w^T \phi(x_i) + b) \geq 1 - \xi_i, \xi_i \geq 0$ where vector w is perpendicular to the separating hypersurface, the offset variable b is used to increase the margin, the slack variable $\varepsilon_i$ represents the degree of misclassification of $x_i$, the function $\varphi$ maps the vector $x_i$ into a higher dimensional space, and C represents a penalty parameter of the error term. A support vector machine supports linear classification but can be adapted to perform nonlinear classification by modifying the kernel function as represented by the following:

$$(K(x_i, x_j) = \varphi(x_i)^T \varphi(x_j))$$

In some embodiments, the recommendation system uses a radial basis function ("RBF") kernel as represented by the following:

$$K(x_i, x_j) = \exp(-y\|x_i - x_j\|^2), y > 0$$

The recommendation system may also use a polynomial Gaussian RBF or a sigmoid kernel. The recommendation system may use cross-validation and grid search to find optimal values for parameters y and C. (See Hsu, C. W., Chang, C. C., and Lin, C. J., "A Practical Guide to Support Vector Classification," Technical Report, Dept. of Computer Science and Information Engineering, National Taiwan University, Taipei, 2010.)

Figure 8:
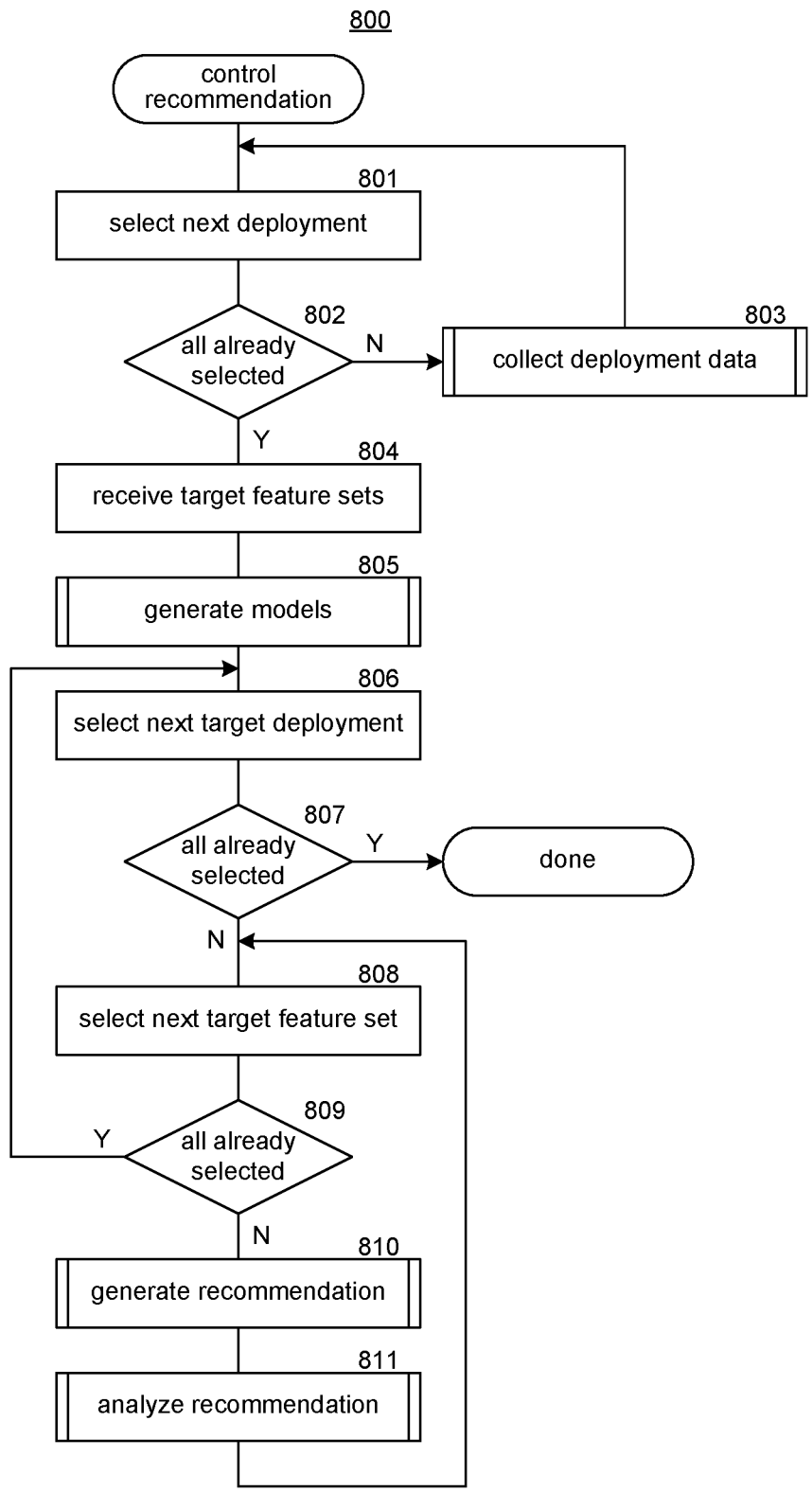
FIG. 8 is a flow diagram that illustrates processing of a control recommendation component in some embodiments.

FIG. 8 is a flow diagram that illustrates processing of a control recommendation component in some embodiments. A control recommendation component 800 controls the overall processing of the recommendation system. In blocks 801-803, the component loops collecting the deployment data from the deployments of a data center. In block 801, the component selects the next deployment. In decision block 802, if all the deployments have already been selected, the component continues at block 804, else the component continues at block 803. In block 803, the component invokes a collect deployment data component to collect the deployment data for the selected deployment and then loops to block 801 to select the next deployment. In some embodiments, the various deployments may store their deployment data at a central repository so that the recommendation system can use the data without having to collect the data individually from the various deployments. In block 804, the component receives target feature sets with each target feature set specifying one or more target features. A target feature set is a set of target features whose recommendation would likely be made as a group or are related in some other way. For example, one target feature set may specify configuration features of a firewall, and another target feature set may specify features such as number of virtual machines and amount of storage. The recommendation system generates separate models for each target feature set. In block 805, the component invokes a generate models component to generate models for each target feature set. In blocks 806-811, the component loops providing recommendations for target deployments. In block 806, the component selects the next target deployment. In decision block 807, if all the target deployments have already been selected, then the component completes, else the component continues at block 808. In block 808, the component selects the next target feature set. In decision block 809, if all the target feature sets have already been selected, then the component loops to block 806 to select the next target deployment, else the component continues at block 810. In block 810, the component invokes a generate recommendation component to generate a recommendation for the selected target deployment for the selected target feature set. In block 811, the component invokes an analyze recommendation component to analyze the generated recommendation and then loops to block 808 to select the next target feature set.

Figure 9:
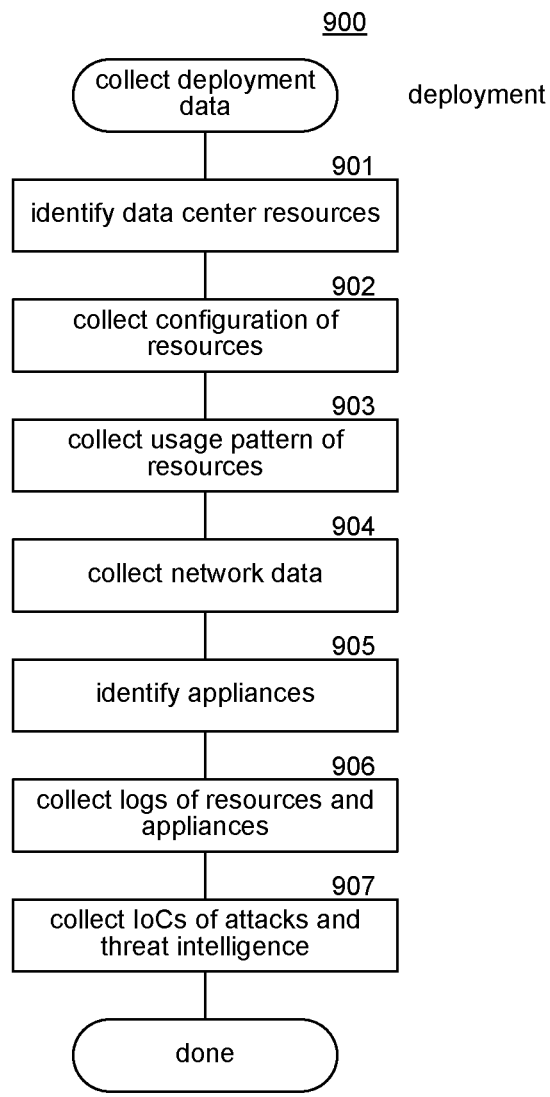
FIG. 9 is a flow diagram that illustrates processing of a collect deployment data component in some embodiments.

FIG. 9 is a flow diagram that illustrates processing of a collect deployment data component in some embodiments. A collect deployment data component 900 is passed an indication of a deployment and collects the deployment data for that deployment. In block 901, the component identifies data center resources of the deployment and a history of changes to the resources. For example, the fact that a deployment used a certain configuration with a small number of virtual machines but changed that configuration when the number of virtual machines was increased may be useful in recommending changes to configuration when a target deployment has increased its number of virtual machines. In block 902, the component collects configuration information for the resources (e.g., applications executed on virtual machines, amount of memory of virtual machines, and so on). In block 903, the component collects usage patterns of the resources. The usage patterns may include patterns of users accessing the deployment, patterns of applications accessing resources of the deployment, and so on. In block 904, the component collects network data of the deployment. For example, the network data may include the types of network traffic (e.g., video), amount of network traffic, and so on. In block 905, the component identifies the appliances used by the deployment. In block 906, the component collects the logs of the resources and the appliances. For example, the logs may indicate when each user logged on to an application of a deployment. In block 907, the component collects various indicators of compromise regarding attacks and threat intelligence from the deployment and then completes. The component may, for example, analyze usage patterns to determine whether an attack (e.g., denial of service) was attempted. A deployment may purchase threat intelligence that, for example, identifies Internet Protocol ("IP") addresses whose access should be blocked by a firewall.

Figure 10:
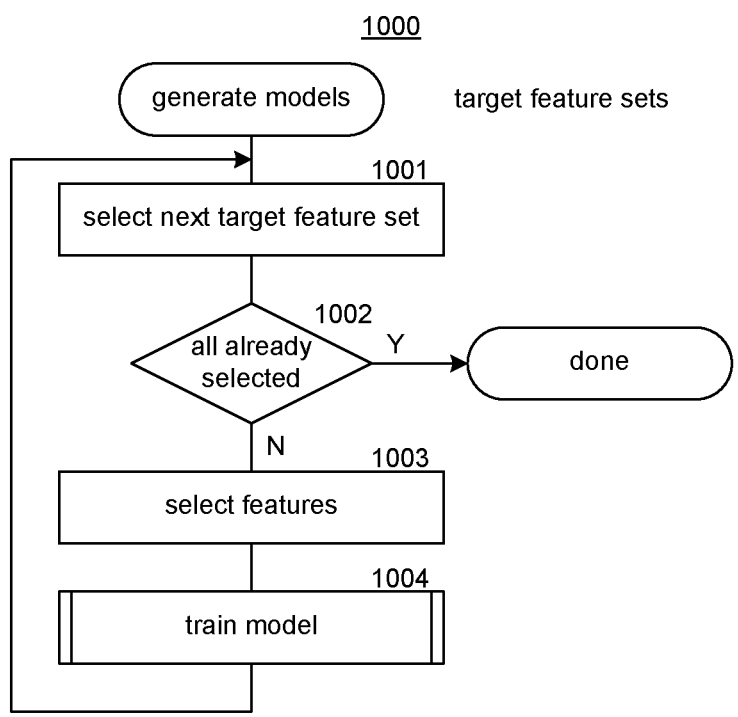
FIG. 10 is a flow diagram that illustrates processing of a generate models component of the recommendation system in some embodiments.

FIG. 10 is a flow diagram that illustrates processing of a generate models component of the recommendation system in some embodiments. A generate models component 1000 is provided target feature sets and trains a model for each target feature set. In block 1001, the component selects the next target feature set. In decision block 1002, if all the target feature sets have already been selected, then the component completes, else the component continues at block 1003. In block 1003, the component selects the features for use in training the model. The component may employ a feature selection algorithm that searches for a subset of features that can effectively model the target feature set. The feature selection algorithm may train models using various subsets of features of certain deployments and score each model based on a set of deployments that were not used to train the model (e.g., cross-validation). In some embodiments, a feature selection algorithm may start out with all features and repeatedly generate models and remove the least significant features until some termination criterion is satisfied. Alternatively, or in addition, the component may use a principal component analysis technique to identify the informative features for selection of the target feature set. In block 1004, the component invokes a train model component to train a model and then loops to block 1001 to select the next target feature set.

Figure 11:
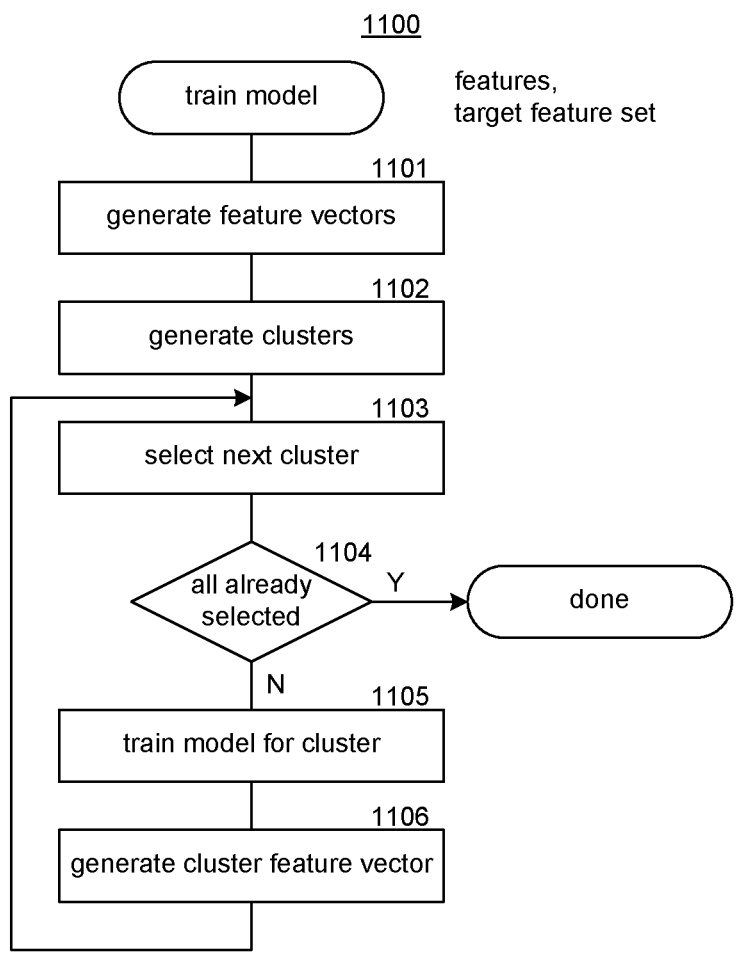
FIG. 11 is a flow diagram that illustrates the processing of a train model component in some embodiments.

FIG. 11 is a flow diagram that illustrates the processing of a train model component in some embodiments. A train model component 1100 is passed an indication of features and a target feature set and trains a model for the target feature set using the features. In block 1101, the component generates, for each deployment, a feature vector from the features. In block 1102, the component generates clusters of deployments based on the feature vectors. In blocks 1103-1106, the component loops training a model for each cluster. In block 1103, the component selects the next cluster. In decision block 1104, if all the clusters have already been selected, then the component completes, else the component continues at block 1105. In block 1105, the component trains a model for the cluster using the feature vectors of the deployments in the cluster and values of the target features of the target feature set as labels. In block 1106, the component generates a representative feature vector for the cluster and then loops to block 1103 to select the next cluster. The component may also train a separate model for each target feature of the target feature set.

Figure 12:
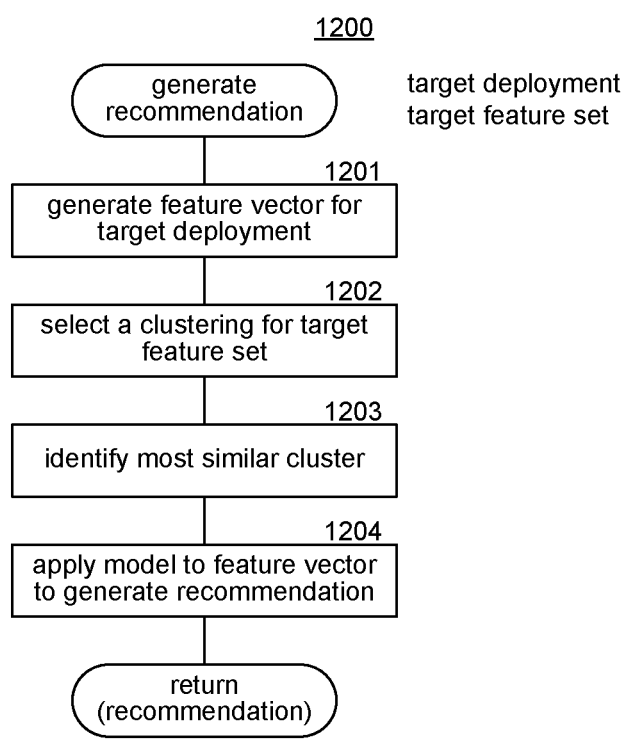
FIG. 12 is a flow diagram that illustrates processing of a generate recommendation component in some embodiments.

FIG. 12 is a flow diagram that illustrates processing of a generate recommendation component in some embodiments. A generate recommendation component 1200 is invoked passing an indication of a target deployment and a target feature set. The component recommends a value for the target deployment for each target feature in the target feature set. In block 1201, the component generates a feature vector for the target deployment. In block 1202, the component selects a clustering of the deployments that was generated for the target feature set. In block 1203, the component identifies the cluster that is most similar to the feature vector based on the representative feature vectors of the clusters. In block 1204, the component applies the model of the identified cluster to the feature vector to generate a recommendation for feature values for the target feature set and then completes.

Figure 13:
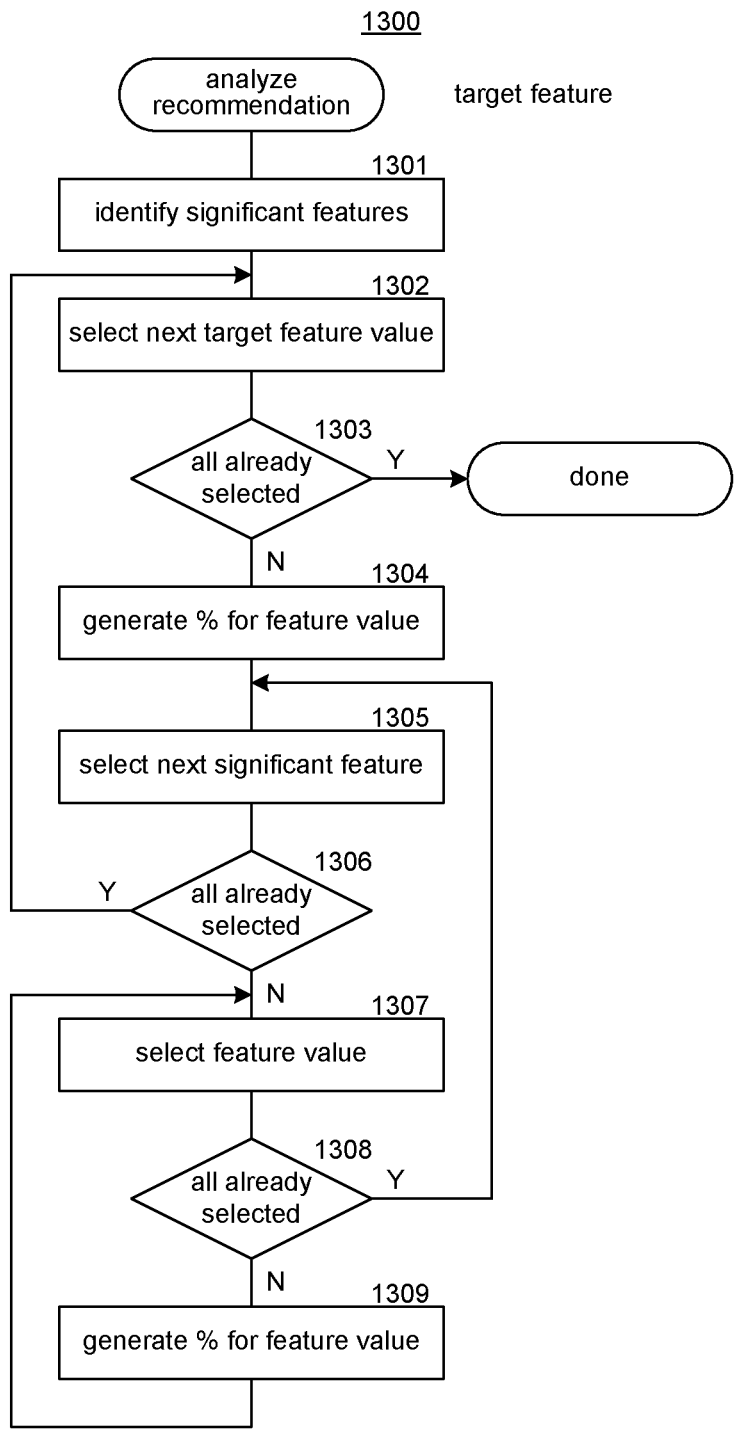
FIG. 13 is a flow diagram that illustrates processing of an analyze recommendation component in some embodiments.

FIG. 13 is a flow diagram that illustrates processing of an analyze recommendation component in some embodiments. An analyze recommendation component 1300 is invoked passing a recommended feature value of a target feature and an indication of the cluster whose model was used to recommend that feature value. The component identifies significant features that were used in providing the recommendation for the target feature and then computes various statistics to explain the recommendation. In block 1301, the component identifies the significant features used in making the recommendation. The significant features may have been identified by a feature selection algorithm. The feature selection algorithm may generate an evaluation score for different subsets of features that indicates how well a subset of features models the target feature. In block 1302, the component selects the next distinct target feature value of a deployment in the cluster. For example, if 20 deployments have the target feature value of A, 10 deployments have the target feature value of B, and one deployment has the target feature value of C, then there would be three distinct target feature values. Alternatively, the component may select distinct target feature values for all deployments regardless of the clustering so that the statistics are based on all deployments. The component may also generate statistics based on both of the deployments of the cluster and all deployments. In block 1303, if all the feature values for the target feature have already been selected, then the component completes, else the component continues at block 1304. In block 1304, the component generates a percentage for the selected feature value as the percentage of deployments in the cluster that have that selected feature value. In block 1305, the component selects the next significant feature starting with the most significant feature. In decision block 1306, if all the significant features have already been selected, then the component loops to block 1302 to select the next feature value of the target feature, else the component continues at block 1307. In block 1307, the component selects the next feature value of the selected significant feature. In decision block 1308, if all the feature values have already been selected, then the component loops to block 1305 to select the next significant feature, else the component continues at block 1309. In block 1309, the component generates a percentage for the selected feature value for the selected significant feature and then loops to block 1307 to select the next feature value.

The following paragraphs describe various embodiments of aspects of the recommendation system. An implementation of the recommendation system may employ any combination of the embodiments. The processing described below may be performed by a computing device with a processor that executes computer-executable instructions stored on a computer-readable storage medium that implements the recommendation system.

In some embodiments, a method performed by a computing system for recommending a target feature value for a target feature for a target deployment within a data center is provided. The method, for each of a plurality of deployments within the data center, collects feature values for features of that deployment, the features including the target feature. The method generates a model for recommending a target feature value for the target feature based on the collected feature values of the features for the deployments. The feature value for the target feature of a deployment is a label for that deployment. The method applies the model to the features of the target deployment to identify a target feature value for the target feature. The method provides the identified target feature value as a recommendation for the target feature for the target deployment. In some embodiments, a method clusters the deployments based on similarity between features of the deployments and for each cluster, generates a model for that cluster based on the collected feature values of the features for the deployments within the cluster, with the target feature value for the target feature being a label for a deployment. In some embodiments, a method selects a model of a cluster based on similarity of the features of the target deployment to the features of the deployments within the cluster. In some embodiments, a method generates an analysis of the recommendation based on significant features that contributed to the recommendation of the identified target feature value. In some embodiments, the features are selected from a group consisting of data center resource information, appliance information, network information, and indicators of compromise. In some embodiments, the data center resource information includes one or more of identification of data center resources, configuration of data center resources, logs of data center resources, and usage patterns of data center resources. In some embodiments, the appliance information includes one or more of identification of appliances, configuration of appliances, and logs of appliances. In some embodiments, a method receives an indication of a restricted feature for a certain deployment and suppresses the collecting of the restricted feature from that certain deployment. In some embodiments, a method receives an indication of a policy for the target feature of the target deployment and ensures that the identified target feature value is consistent with the policy of the target deployment. In some embodiments, the features used to generate the model are selected using a feature selection algorithm that generates an evaluation score for different subsets of features, the evaluation score indicating how well a subset of features models the target feature.

In some embodiments, a computing system for identifying a target feature value for a target feature for a target deployment is provided. The computing system comprises a processor for executing computer-executable instructions and a computer-readable storage medium storing computer-executable instructions. The instructions generate training data that includes for each of a plurality of deployments, a feature vector of feature values of features of the deployment. The instructions generate a model for recommending a target feature value for the target feature based on the training data. The instructions apply the model to a feature vector of feature values of the target deployment to identify the target feature value for the target feature for the target deployment. In some embodiments, the instructions that generate the training data further label the feature vector of a deployment with the feature value of the deployment for the target feature. In some embodiments, the instructions further cluster the deployments based on similarity between features of the deployments and wherein the instructions that generate a model generate a model for each cluster using the feature vectors of the deployments in the cluster. In some embodiments, the instructions that apply the model select a model of a cluster based on similarity of the feature vector of the target deployment to the feature vectors of the deployments within the cluster. In some embodiments, the instructions generate an analysis of the identified target feature value based on significant features that contributed to the identification of the identified target feature value. In some embodiments, the instructions automatically change a current target feature value of the target deployment to the identified target feature value.

In some embodiments, a method performed by a computing system for providing a recommendation of a target feature value for a target feature of a target deployment is provided. The method monitors changes in feature values of features of deployments. When the changes satisfy a recommendation criterion, the method generates a model for recommending a target feature value for the target feature based on feature values of features of the deployments and applies the model to feature values of the target deployment to identify the target feature value for the target feature for the target deployment. In some embodiments, a changed feature value is for the target feature. In some embodiments, a changed feature value is for a feature other than the target feature. In some embodiments, the method automatically implements the identified target feature value for the target deployment.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the feature values may be collected from deployments of multiple data centers that may include deployments in private data centers of organizations, deployments in cloud-based data centers, and so. As an example, provider of security appliances may request that its customers provide their feature values of the security features of their installations of the security appliances. The provider can then, based on those feature values, make recommendations to its current customers for changes in feature values, new customers for initial feature values, and so on. Accordingly, the invention is not limited except as by the appended claims.

The invention claimed is:

1. A method performed by a computing system, the method comprising:
for each of a plurality of deployments within a data center, collecting feature values for features of that deployment, the features defining possible configurations of systems of that deployment, the features including a target feature;
clustering the deployments among a plurality of clusters based on amount of differences between the features of the deployments;
generating a model for each cluster based on the feature values of the features for the deployments in the cluster to provide a plurality of models for the plurality of respective clusters, with the feature value of the target feature for each deployment in each cluster being a label for that deployment;
selecting a model of an identified cluster from the plurality of models for the plurality of respective clusters based on a similarity between the features of the target deployment and the features of the deployments in the identified cluster being greater than a similarity between the features of the target deployment and the features of the deployments in each other cluster of the plurality of clusters;
identifying a target feature value for the target feature by applying the model of the identified cluster to the features of a target deployment;
providing the target feature value as a recommendation for the target feature for the target deployment; and
automatically implementing the recommendation.

2. The method of claim 1 further comprising generating an analysis of the recommendation based on features that contributed to the recommendation of the identified target feature value.

3. The method of claim 1 wherein the features are selected from a group consisting of data center resource information, appliance information, network information, and indicators of compromise.

4. The method of claim 3 wherein the data center resource information includes one or more of identification of data center resources, configuration of data center resources, logs of data center resources, and usage patterns of data center resources.

5. The method of claim 3 wherein the appliance information includes one or more of identification of appliances, configuration of appliances, and logs of appliances.

6. The method of claim 1 further comprising:
receiving an indication of a restricted feature for a certain deployment; and
suppressing the collecting of the restricted feature from that certain deployment.

7. The method of claim 1 further comprising:
receiving an indication of a policy for the target feature of the target deployment; and
ensuring that the identified target feature value is consistent with the policy of the target deployment.

8. The method of claim 1 wherein the features used to generate the model are selected using a feature selection algorithm that generates an evaluation score for different subsets of features, the evaluation score indicating how well a subset of features models the target feature.

9. A computing system to identify a target feature value for a target feature for a target deployment, the computing system comprising:
a processor for executing computer-executable instructions; and
a computer-readable storage medium storing computer-executable instructions that, when executed by the processor,
generate training data that includes for each of a plurality of deployments, a feature vector of feature values of features of that deployment, the features defining possible configurations of systems of that deployment;
generate a model for each of a plurality of clusters of the deployments, which are clustered based on amount of differences between the feature vectors of the feature values of the features of the deployments, based on the training data to provide a plurality of models for the plurality of respective clusters;
select a model of an identified cluster from the plurality of models for the plurality of respective clusters based on a similarity between a feature vector of feature values of features of the target deployment and a representation of the feature vectors of the feature values of the features of the deployments in the identified cluster being greater than a similarity between the feature vector of the feature values of the features of the target deployment and a representation of the feature vectors of the feature values of the features of the deployments in each other cluster of the plurality of clusters;
identify the target feature value for the target feature by applying the model of the identified cluster to the feature vector of the feature values of the target deployment; and
automatically change a current feature value of the target feature to the target feature value that is identified by applying the model of the identified cluster to the feature vector of feature values of the target deployment.

10. The computing system of claim 9 wherein the computer-executable instructions that generate the training data further label the feature vector of a deployment with the feature value of the deployment for the target feature.

11. The computing system of claim 9 wherein the computer-executable instructions further include instructions that, when executed by the processor, cluster the deployments based on the amount of differences between the features of the deployments.

12. The computing system of claim 9 wherein the computer-executable instructions further include instructions that, when executed by the processor, generate an analysis of the identified target feature value based on features that contributed to the identification of the identified target feature value.

13. The computing system of claim 9 wherein the computer-executable instructions further include instructions that, when executed by the processor, automatically change a current target feature value of the target deployment to the identified target feature value.

14. The method of claim 1, wherein the target feature is a firewall.

15. The method of claim 14, wherein the target feature value is a name of the firewall.

16. The method of claim 1, wherein identifying the target feature value comprises:
   identifying the target feature value by using a collaborative filtering technique to apply the model of the identified cluster to the features of the target deployment.

17. The method of claim 1, wherein clustering the deployments among the plurality of clusters comprises:
   clustering the deployments among the plurality of clusters using a plurality of respective different sets of features.

18. The computing system of claim 1, wherein the computer-executable instructions, when executed by the processor, generate the plurality of models for the plurality of respective clusters of the deployments using a plurality of respective different sets of features in the training data.

19. A computer program product comprising a computer-readable storage medium having instructions recorded thereon for enabling a processor-based system to perform operations, the operations comprising:
   for each of a plurality of deployments within a data center, collecting feature values for features of that deployment, the features defining possible configurations of systems of that deployment, the features including a target feature;
   clustering the deployments among a plurality of clusters based on amount of differences between the features of the deployments;
   generating a model for each cluster based on the feature values of the features for the deployments in the cluster to provide a plurality of models for the plurality of respective clusters, with the feature value of the target feature for each deployment in each cluster being a label for that deployment;
   selecting a model of an identified cluster from the plurality of models for the plurality of respective clusters based on a similarity between the features of the target deployment and the features of the deployments in the identified cluster being greater than a similarity between the features of the target deployment and the features of the deployments in each other cluster of the plurality of clusters;
   identifying a target feature value for the target feature by applying the model of the identified cluster to the features of a target deployment;
   providing the target feature value as a recommendation for the target feature for the target deployment; and
   automatically implementing the recommendation.

20. The computer program product of claim 1, wherein the operations comprise at least one of the following:
   clustering the deployments among the plurality of clusters using a first plurality of respective different sets of features; or
   generating the plurality of models for the plurality of respective clusters of the deployments using a second plurality of respective different sets of features in the training data.

* * * * *